US007056964B2

(12) United States Patent
Lettkeman et al.

(10) Patent No.: US 7,056,964 B2
(45) Date of Patent: Jun. 6, 2006

(54) HIGH STRENGTH FLOORING COMPOSITIONS

(75) Inventors: Dennis Mark Lettkeman, Watonga, OK (US); Raymond A. Kaligian, II, Geneva, IL (US); Eldon L. Whiteside, Hinsdale, IL (US); William K. Bedwell, Okeene, OK (US); Sharon Meiseman, Okeene, OK (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 10/511,338

(22) PCT Filed: Mar. 27, 2003

(86) PCT No.: PCT/US03/09400

§ 371 (c)(1),
(2), (4) Date: Oct. 15, 2004

(87) PCT Pub. No.: WO03/082766

PCT Pub. Date: Oct. 9, 2003

(65) Prior Publication Data

US 2005/0250888 A1    Nov. 10, 2005

Related U.S. Application Data

(60) Provisional application No. 60/367,920, filed on Mar. 27, 2002.

(51) Int. Cl.
*C04B 24/26* (2006.01)
(52) U.S. Cl. ........................................................ 524/5
(58) Field of Classification Search .................... 524/5
See application file for complete search history.

(56) References Cited

U.S. PATENT DOCUMENTS

| 3,573,947 A | 4/1971 | Kinkade et al. |
| 4,028,125 A | 6/1977 | Martin |
| 4,041,203 A | 8/1977 | Brock et al. |
| 4,067,939 A * | 1/1978 | Lowe et al. ............... 264/42 |
| 4,202,857 A | 5/1980 | Lowe |
| 4,238,239 A | 12/1980 | Brown |
| 4,341,560 A | 7/1982 | Saito et al. |
| 4,471,100 A | 9/1984 | Tsubakimoto et al. |
| 4,666,971 A | 5/1987 | Greenhalgh |
| 4,814,014 A | 3/1989 | Arfaei |
| 4,960,465 A | 10/1990 | Arfaei |
| 5,118,751 A | 6/1992 | Schulze et al. |
| 5,169,706 A | 12/1992 | Collier, IV et al. |
| 5,175,278 A | 12/1992 | Peik et al. |
| 5,223,036 A | 6/1993 | Koyata et al. |
| 5,362,323 A | 11/1994 | Koyata et al. |
| 5,369,198 A | 11/1994 | Albrecht et al. |
| 5,387,626 A | 2/1995 | Bohme-Kovac et al. |
| 5,393,343 A | 2/1995 | Darwin et al. |
| 5,424,099 A | 6/1995 | Stewart et al. |
| 5,472,500 A | 12/1995 | Janicki |
| 5,556,460 A | 9/1996 | Berke et al. |
| 5,614,017 A | 3/1997 | Shawl |
| 5,643,978 A | 7/1997 | Darwin et al. |
| 5,665,158 A | 9/1997 | Darwin et al. |
| 5,670,578 A | 9/1997 | Shawl |
| 5,703,174 A | 12/1997 | Arfaei et al. |
| 5,725,656 A | 3/1998 | Shimanovich et al. |
| 5,725,657 A | 3/1998 | Darwin et al. |
| 5,739,212 A | 4/1998 | Wutz et al. |
| 5,779,786 A | 7/1998 | Patel |
| 5,798,425 A | 8/1998 | Albrecht et al. |
| 5,879,446 A | 3/1999 | Patel et al. |
| 5,925,184 A | 7/1999 | Hirata et al. |
| 5,985,989 A | 11/1999 | Shawl et al. |
| 6,034,208 A | 3/2000 | McDaniel et al. |
| 6,043,329 A | 3/2000 | Lepori et al. |
| 6,068,697 A | 5/2000 | Yamamuro et al. |
| 6,110,271 A | 8/2000 | Skaggs et al. |
| 6,150,437 A | 11/2000 | Wutz et al. |
| 6,166,112 A | 12/2000 | Hirata et al. |
| 6,187,409 B1 | 2/2001 | Mathieu |
| 6,187,887 B1 | 2/2001 | Albrecht et al. |
| 6,264,739 B1 | 7/2001 | Yamato et al. |
| 6,294,015 B1 | 9/2001 | Yamashita et al. |
| 6,355,099 B1 | 3/2002 | Immordino et al. |
| 6,376,581 B1 | 4/2002 | Tanaka et al. |
| 6,488,792 B1 | 12/2002 | Mathieu |

(Continued)

FOREIGN PATENT DOCUMENTS

EP    0644165    3/1995

(Continued)

OTHER PUBLICATIONS

"A New Generation of Gypsum Dispersing Agents," S. Lee, F. Liotta and S. Schwartz, Global Gypsum Conference 2003 Paper 17, Barcelona, Sep. 14-16, 2002.

(Continued)

*Primary Examiner*—Peter Szekely
(74) *Attorney, Agent, or Firm*—Greer, Burns & Crain, Ltd.; David F. Janci, Esq.; Michael M. Geoffrey, Esq.

(57) ABSTRACT

A composition is disclosed for a mixture to be used in conjunction with water for preparing a slurry that hydrates to form a high strength flooring compound. The mixture includes from about 50% to about 98% by weight calcium sulfate hemihydrate, having at least 25% of the calcium sulfate hemihydrate in the beta-calcined form. A polycarboxylate dispersant is included in the mixture in amounts from about 0.2% to about 10% by weight. The mixture also includes 0.05–50% by weight enhancing component. When combined with recommended amounts of water, a slurry is formed that is useful as a flooring composition.

22 Claims, No Drawings

U.S. PATENT DOCUMENTS

| | | |
|---|---|---|
| 6,527,850 B1 | 3/2003 | Schwartz et al. |
| 6,620,879 B1 | 9/2003 | Albrecht et al. |
| 2003/0167973 A1 | 9/2003 | Peev et al. |

FOREIGN PATENT DOCUMENTS

| | | |
|---|---|---|
| EP | 0725044 | 8/1996 |
| EP | 1138696 | 10/2001 |
| EP | 1142847 | 10/2001 |
| EP | 1138697 | 11/2003 |
| JP | 56045857 | 4/1981 |
| JP | 59025876 | 2/1984 |
| JP | 60-171260 | * 9/1985 |
| JP | 61040861 | 8/1996 |
| WO | WO 95/33698 | 12/1995 |
| WO | WO 01/81263 | 11/2001 |

OTHER PUBLICATIONS

"Gypsum Dispersing Agents," Steven A. Schwartz, Global Gypsum Conference 2002, Florida, Mar. 3-4, 2002.

* cited by examiner

HIGH STRENGTH FLOORING COMPOSITIONS

CROSS REFERENCE TO RELATED APPLICATIONS

This application claims the benefit of U.S. Provisional Application 60/367,920, filed Mar. 27, 2002.

BACKGROUND

This invention relates to a high strength flooring composition. More specifically, it relates to a flooring composition made using beta-calcined calcium sulfate hemihydrate.

Both gypsum and cement are well known as construction materials. Gypsum is the principal component of the familiar wallboard, where is it faced with paper to provide strength and a smooth surface. Cement is used in various applications where its water resistance and hardness are important, such as in concrete structures. Cement is also used in building panels where its hardness and water resistance are important.

Gypsum is also known as calcium sulfate dihydrate, terra alba or landplaster. Plaster of Paris is also known as calcined gypsum, stucco, calcium sulfate semihydrate, calcium sulfate half-hydrate or calcium sulfate hemihydrate. Synthetic gypsum, which is a byproduct of flue gas desulfurization processes from power plants, may also be used. When it is mined, raw gypsum is found in the dihydrate form. In this form, there are approximately two water molecules of water associated with each molecule of calcium sulfate. In order to produce the hemihydrate form, the gypsum can be calcined to drive off some of the water of hydration by the following equation:

$$CaSO_4.2H_2O \rightarrow CaSO_4.1/2H_2O + 3/2H_2O$$

When mixed with water, the hemihydrate rehydrates to form an interlocking matrix of interlocking dihydrate crystals. Gypsum hydration occurs in a matter of minutes or hours compared to several days for cement. This makes gypsum an attractive alternative for cement for flooring applications if sufficient hardness and strength can be achieved in the gypsum.

Calcium sulfate hemihydrate can produce at least two crystal forms. Alpha-calcined gypsum is made by a continuous process or lump rock process whereby the calcium sulfate dihydrate is calcined under pressure. The alpha-calcined gypsum forms less acicular crystals than beta-calcined gypsum, allowing the crystals to pack tightly together, making a denser and stronger plaster. The crystal morphology allows water to flow easily between the crystals, requiring less water to form a flowable slurry. More elongated crystals are characteristic of the beta-calcined gypsum. This crystal structure results in a less dense product because the crystals are more loosely packed. The beta form also requires more water to fluidize the calcined gypsum. In applications where hardness is important, alpha-calcined gypsum is usually preferred, despite higher cost and limited availability.

When choosing a calcined gypsum for an application, beta-calcined gypsum is often selected due to its ready availability and its reduced cost. Because beta-calcined gypsum is also more common, it can incur reduced shipping and storage costs than the alpha form. However, the crystal structure makes it difficult to make a strong, dense gypsum because more water is needed to produce a slurry of a given fluidity.

Superplasticizer additives are known to improve the fluidity of a gypsum slurry. They disperse the molecules in solution so that they move more easily relative to each other, thereby improving the flowability of the entire slurry. Sulfonated melamines and sulfonated naphthalenes are known as superplasticizers, however, the improved fluidity obtained is not sufficient to permit complete substitution of beta-calcined hemihydrate for alpha-calcined hemihydrate in high strength flooring applications.

BRIEF DESCRIPTION OF THE INVENTION

Polycarboxylates are also known as superplasticizers for use with cement. However, when used together with an enhancing component, polycarboxylates perform far better than conventional superplasticizers, such as sulfonated naphthalenes or sulfonated melamines.

More specifically, an embodiment of this invention is a mixture to be used in conjunction with water for preparing a slurry that hydrates to form a high strength flooring compound. The mixture includes from about 50% to about 98% by weight calcium sulfate hemihydrate, having at least 25% of the calcium sulfate hemihydrate in the beta-calcined form. A polycarboxylate dispersant is included in the mixture in amounts from about 0.2% to about 10% by weight. The mixture also includes 0.05–50% by weight enhancing component. When combined with recommended amounts of water, a slurry is formed that is useful as a flooring composition.

In another embodiment of this invention, fast drying flooring compositions are obtained by reducing the water to less than 25% of the weight of the dry ingredients. Use of alpha-hemihydrate for up to 100% the total hemihydrate is preferred.

The present composition results in formation of a high-strength flooring even when 100% beta-calcined hemihydrate is used. In the presence of the enhancing component, the polycarboxylate dispersant is more effective than other superplasticizers, making the slurry more fluid and flowable. Fluidity of the mixture is so good that beta-calcined gypsum is fluidized in the slurry at low water usage to make a denser, stronger flooring product than is known in the art.

DETAILED DESCRIPTION OF THE INVENTION

A mixture for making a slurry suitable for use in flooring applications is made from calcium sulfate hemihydrate, an enhancing component and a polycarboxylate dispersant. High strength floors and subfloors are made with this composition having compressive strength in excess of 2500 pounds per square inch (175 Kg/cm$^2$). In a preferred embodiment described in detail below, all components of the composition are described in terms of dry ingredients in a dry mixture. It is contemplated that this is only one possible embodiment, and that liquid ingredients, when measured on a dry solids basis, are equivalent to the dry components. Unless otherwise stated, all components are measured in terms of weight on a dry solids basis, excluding any aggregate or fillers that may be present.

The primary component of the dry mixture is calcium sulfate hemihydrate. The dry mixture composition preferably includes from about 50% to about 98% hemihydrate by weight. More preferably, from about 80% to about 98%, from about 80% to about 95% or from about 88% to about 95% of the dry mixture is calcium sulfate hemihydrate.

Any type of hemihydrate is useful in this mixture. It can be prepared by any known process, such as slurry processes, lump rock processes or atmospheric calcination methods. Either alpha calcined calcium sulfate hemihydrate or beta calcium sulfate hemihydrate are useful in the mixture. The alpha form of calcium sulfate hemihydrate crystals is less acicular in shape than the beta version. The less acicular shape allows the crystals to wet out and flow much better when mixed with water. The lower water demand of the alpha form results in a more closely packed, and higher density composite in comparison to the resultant interlocking matrix of calcium sulfate hemihydrate crystals utilizing the beta form of calcium sulfate hemihydrate. As is known in the art, the combination of alpha and/or beta calcium sulfate hemihydrate controls the amount of water needed to form a workable slurry, which controls the density of the final cast model.

Any alpha or beta-calcined hemihydrate is suitable for use in the present composition. Preferred alpha-hemihydrates include those made from a slurry process, such as HYDRO-CAL C-Base, J-Base or E-Base from United States Gypsum Company (Chicago, Ill.), by lump rock processes, such as HYDROCAL A-Base or B-Base, or any other method of making alpha-calcined hemihydrate. No. 1 Moulding plaster is a preferred beta-hemihydrate from United States Gypsum Co. (Chicago, Ill.). Continuously calcined synthetic gypsum is equivalent to beta-calcined hemihydrate. Beta-hemihydrate made from other methods is also useful. The addition of soluble calcium sulfate anhydrite is a suitable substitute for up to 50% of the hemihydrate, and will serve to make provide strength to the matrix. Calcium sulfate dihydrate serves as a filler and should be used only in minor amounts, less than 25% by weight of the hemihydrate.

Whether beta-calcined gypsum, alpha-calcined gypsum or a combination of alpha and beta is selected for a particular application depends on a number of factors. Preferably, beta-calcined gypsum is used to a large extent where cost is a primary concern. Beta-calcined gypsum also has higher workability and bleeds less than the alpha form. However, in some embodiments, where even higher strength is desirable, the alpha-hemihydrate or mixtures of the alpha and beta forms are preferred. Where mixtures of alpha and beta-calcined hemihydrate are used, the mixture should include at least 25% beta-hemihydrate. Preferably, the amount of the beta-calcined form is greater than 50% or greater than 90% of the total hemihydrate.

The enhancing component is at least one of cement and lime. When tested with gypsum in the absence of cement or lime, polycarboxylates had dispersing properties comparable to those of other well-known dispersants. However, when combined with an enhancing component, the polycarboxylate surprisingly displays even greater dispersion properties.

At least one enhancing component must be present to obtain the extraordinary performance from the polycarboxylate. Preferred enhancing components include lime and hydraulic cement. At least 0.05% lime or an equivalent alkaline material is required. Generally, the enhancing component is present in amounts of from about 0.05% to about 10% if it is not a hydraulic material. Preferably, the concentration of lime is less than 2.5% or less than 1% by weight of the dry ingredients. The use of two or more enhancing components is also contemplated. In a dry powder form, lime is convenient for the addition to the preferred dry mixture, however, it is also contemplated that liquid forms are also useful, and could be added to the water prior to addition of the dry mixture. If a liquid is used, the amount of alkaline material should be measured on a dry solids basis and any water should be considered in the water content of the slurry.

If the enhancing component is cement or other siliceous hydraulic material, amounts up to 50% of the dry mixture can be used. Like gypsum, hydraulic cement hardens be a chemical interaction with water. Exemplary hydraulic cements are Portland cement, fly ash, blast furnace slag, and silica fume. The most widely used cement is Portland cement (Aalsborg Cement, Denmark), which is particularly preferred for use in this invention. More preferred cements are Type 1, Type 3 and Type 5 cements. Either gray or white cement can be used. Class C cement, slag cement and #1 Impmill cement are also contemplated for use in this composition. Other hydraulic silicates are also considered to be useful as the enhancing component. If no other enhancing components are present, the mixture includes at least 0.5% cement. Preferably the concentration of cement is from about 1.7% to about 50% by weight of the dry ingredient weight.

The polycarboxylate dispersant is required in concentrations of from about 0.2% to about 10% by weight on a dry component basis. More preferably, the dry mixture includes from about 0.2% to about 5% or about 0.2% to about 2.5% of the polycarboxylate.

Polycarboxylates are known for use with hydraulic cement. A wide variety of polycarboxylates can be used in the dry mixture, including, but not limited to polycarboxylic acids and acrylic latex polymers. Preferably the polycarboxylates are water soluble. The polycarboxylate polymer includes at least two carboxylate salt or ionic groups, at least two carboxylic acid groups or at least one carboxylate salt or ion group and at least one carboxylic acid group. Molecular weights of from about 100,000 to about 5,000,000 Daltons are preferred. Polycarboxylates outside the preferred molecular weight range tend to be less effective, while higher molecular weight materials are extremely viscous and difficult to pump. Methods of making polycarboxylate dispersants are well known to those skilled in the art.

The polycarboxylate polymers are added in amounts of from about 0.2% to about 10% by weight. Other preferred ranges include from about 0.2% to about 5% and from 0.2% to about 2%. The exact amount of polycarboxylate dispersant depends on the composition with which it is used. Polycarboxylates may be used alone or in combination with other plasticizers including, but not limited to, lignins, sulfonated naphthalene and/or sulfonated melamine dispersants.

Preferred Polycarboxylates are polymers prepared by polymerization of a monomer mixture that includes an unsaturated carboxylic acid type polymer. MELFLUX 1641 by SKW Polymers (Kennesaw, Ga.) is a particularly preferred polycarboxylate. It is a free flowing powder produced by spray-drying a modified polyether carboxylate. Other preferred polycarboxylate dispersants include MELFLUX 1643 or 1643F (SKW Polymers, Kennesaw, Ga.), which are based on oxyalkylene-alkyl ethers and unsaturated dicarboxylic acid derivatives and are described in U.S. Pat. No. 5,798,425. Other suitable polycarboxylate dispersants include acrylic resin latexes, modified acrylic polymers such as those described in European Patent 1,138,698, copolymers of acrylic acid and acrylamide, polymers obtained by grafting substituents such as polyalkylene oxide on a polycarboxylate backbone, poly (methyl vinyl ether/maleic acid) or any polycarboxylate dispersant known to an artisan.

The amount of water added to the dry mixture ranges from 10% of the weight of the dry mixture to about 50% by weight. Preferably, the water content ranges from about 20% to about 40%, from about 12% to about 40% and more preferably from about 28% to about 32%. The selection of a suitable amount of water to be added is within the skill of an artisan. Water usage less than that theoretically needed to hydrate the hydraulic components is used in some embodiments of the composition.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Embodiments to fast drying flooring compositions are also obtainable using up to 100% alpha-hemihydrate. By reducing the water content, there is less water to be removed by drying. The preferable water content ranges from about 15% to about 25%. Improvement in the flowability of the slurry allows formation of a pumpable slurry at lower water levels, even below that theoretically required for complete hydration of the hemihydrate. In any plaster composition, increased water addition decreases the strength of the set plaster.

Many additional ingredients are suitable to optimize the dry mixture. Defoamers are used to reduce air bubbles formed during mixing of the dry mixture with the water. When used, the dry mixture includes up to 0.5% defoamer. FOAMASTER CN (Astro Chemicals, Kankakee, Ill.) is a preferred defoamer.

Boric acid is optionally added to the dry mixture to reduce calcination and mold/mildew growth. Preferably, it is added in amounts up to 1.25%. Other preferable ranges of boric acid addition are up to 1% and up to 0.5%.

Retarders are added to increase the working time of the slurry. Target working time is from about 10 minutes to about 2 hours depending on the composition being used, where and how the slurry is being applied. Any retarders known to be useful with calcium sulfate hemihydrate are suitable in amounts to produce working times consistent with the target range. Proteinaceous retarders, such as SUMA, Cream of Tartar (potassium bitartrate), sodium citrate and diethylenetriamine pentaacetic acid are preferred.

Set accelerators are used to hasten setting of the slurry. Any accelerators known to hasten setting of the hemihydrate may be used, including, but not limited to sulfates, acids and calcium sulfate dihydrate. Useful amounts vary with the efficacy of the accelerator selected, but are generally less than 1% by weight.

Calcium sulfate dihydrate that has been finely ground is a preferred accelerator. When freshly prepared, it has high potency and is suitable for immediate use in the slurry. However, when stored prior to use, it loses its effectiveness. U.S. Pat. No. 2,078,198, herein incorporated by reference, discloses improved accelerators comprising calcium sulfate dihydrate intermixed with a material such as sugar. This mixture renders the calcium sulfate dihydrate less subject to deterioration by aging and is useful in the slurry within several days (weeks). Heating the co-ground sugar and calcium sulfate dihydrate mixture so that caramelized sugar forms a coating on the calcium sulfate dihydrate is disclosed in U.S. Pat. No. 3,573,947, herein incorporated by reference. The melted sugar coating further stabilizes the calcium sulfate dihydrate, reducing the effects of aging to a greater degree than the unheated sugar/dihydrate mixture. Ground calcium sulfate dihydrate prepared in this manner is referenced in the examples as "CSA" (United States Gypsum Co., Chicago, Ill.). In any form, the ground dehydrate is preferably used in concentrations less than 0.5% by weight.

The addition of 0.0006% to about 0.5% polysaccharide improves the sand loading, reduces bleed and settling, and improves pumpability of the composition of this embodiment. The use of polycarboylate and polysaccharides together results in a product that is easy to handle, is uniform and has high strength, a combination of properties that cannot be achieved by the use of either polymer alone. Polysaccharides also act with the polycarboxylate dispersants to keep the components of the slurry in suspension until the crystal matrix forms sufficiently to assure uniform distribution. Sand or other aggregates are prevented from settling. The slurry is less viscous and easier to pump, thereby reducing energy costs. Workability of the composition and surface lubricity are also increased.

The polysaccharides that are particularly preferred for use with this invention are varied. Biopolymeric gums are most preferred. Glucan products, such as scleroglucan, schizophyllan and the like are especially preferred. Scleroglucan is produced by filamentous fungi of the genera Sclerotium. Schizophyllan is an extracellular polysaccharide produced by fungi of the genera Schnizophyllum. Scleroglucan and schizophyllan are polysaccharides whose linear chain of 1–3 linked D-glycosyl units with about 30 to about 35 percent of the linear chain containing single D-glycosyl units that are attached by 1–6 linkages. The average molecular weight is greater than or equal to $5 \times 10^6$. They are nonionic homopolysacchrides. The chains are self-associated in a triple helix arrangement. They dissolve in water to form pseudo plastic solutions. Additional characterization of these compounds and a method for making them is taught in U.S. Pat. No. 4,954,440, herein incorporated by reference. A preferred scleroglucan is marketed by SKW Polymers (Kennesaw, Ga.) under the trade name BIOVIS. Other polysaccharide gums, such as xanthan gums, welan gums and other gums are can also be used with this invention.

Heteropolysaccharides are high molecular weight, generally linear carbohydrate polymers containing two or more different kinds of monosaccharides. The two or more kinds of monosaccharides that form a repeating unit that is polymerized, such as S-657, discussed in U.S. Pat. Nos. 5,175, 278 and 6,110,271 herein incorporated by reference. This polysaccharide is an example of a xanthan gum that is particularly useful in this invention. S-657 forms an extended intertwined 3-fold left-handed double helix with a molecular weight estimated in excess of two million Daltons and is marketed under the trade name Diutan by Kelco Biopolymers (San Diego, Calif.).

When aggregates are added to the composition, any aggregate known to those skilled in the art may be used. Silica sand and other silicates are the most common aggregates used due to their low cost and ready availability. The aggregate can be selected to modify the density of the finished product. A wide range of sands are applicable with this invention, including river sand, Mohawk Medium sand, Rich Mix Fine sand, Atlanta sand, Dothan Sand, Florida sand and the like. Sands of various types can be combined to obtain specific particle size distribution or other properties. Heavier aggregates, such as, but not limited to, rock, gravel, pea gravel and silica fume increase the density of the product, while the addition of hadite, clay, pumice, foam, vermiculite or hollow microspheres decrease the density. Any type of filler, such as perlite, flyash or slag, can also be used. The aggregate is added to the composition in amounts up to 300 wt % of the aggregate-free components on a dry basis.

The compositions of this invention optionally have a number of further additives depending on the specific application. These additives can include thickeners, coloring agents, preservatives and other additives in amounts known in the art. Additives for a particular purpose, as well as the appropriate concentrations, are known to those skilled in the art. Coloring agents, such as pigments, dyes or stains are also useful as additives, particularly in flooring applications. Any known coloring agents can be used with this invention. Titanium dioxide is particularly useful to whiten the composition. The coloring agents are used in amounts and added by methods conventionally used for compositions of this type.

In another embodiment of this invention, the mixture is adjusted to make a self-leveling flooring that requires little or no finishing to produce a high quality, level surface. Slurries for use in this application are more free-flowing. Although the viscosity of the slurry can be reduced merely by adding water, strength of the finished product is reduced and separation of the water, known as bleeding is increased. Leveling compositions generally incorporate a polymeric resin into the slurry and may require modification of the composition.

Leveling compositions also utilize a polymeric resin to modify the surface properties of the finished floor. Surface brittleness is reduced when polymers are used in concentrations of up to 5%, or preferably from about 0.05% to about 1%. Exemplary resins include 10184 and 50E 200 from Elotex AG (Sempach, Switzerland) and VINNAPAS RP-226 (Wacker Polymer Systems, LP, Adrian, Mich.).

It is often advantageous to vary the composition within the scope of this invention depending upon the mixing or pumping equipment that is used. Different brands of pumping equipment produce shear forces that require certain properties of the slurry to flow properly. Some machines utilize aggregate of a specific particle size distribution. Other machine manufacturers recommend slight changes to the composition. Modifications of the composition to accommodate the equipment is considered to be within the skill of one who normally prepares slurries for such equipment.

When used as a topical underlayment, the composition is modified to be free flowing and easily pumped through a hose. Higher fluidity is desired without separation of the aggregate. In this application, water and the polymeric resin are used at the high end of their concentration range. The aggregate should be selected to reduce separation or settling of the solids in the hose.

Use of these compositions requires no special mixing steps or process conditions to make a high quality product. Ingredients to make the dry mixture or the slurry are obtained. Depending on the exact additive selected, it can be available in either liquid form, dry form or both. If used in liquid form, the additive concentration is determined on a dry basis. The present mixture is made by obtaining ingredients comprising from about 50% to about 98% calcium sulfate hemihydrate comprising at least 25% of the beta-calcined form, from about 0.2% to about 10% polycarboxylate dispersant and from about 0.05% to about 50% of an enhancing component, all on a dry solids basis. Optional additives such as set accelerators, retarders, polymeric resins, defoamers, and the like, are also assembled. The ingredients are separated into wet ingredients and dry ingredients for ease of mixing. The dry ingredients are blended in a mixer, such as a Marion mixer, until a homogeneous mixture is attained. The dry mixture is optionally packaged for later sale or distribution.

At the site where the floor or subfloor is to be laid, about 12 cc to about 40 cc of water is measured per 100 grams of the ingredients on a dry solids basis, and placed into a mixing vessel. If any wet or liquid ingredients are used, they are mixed into the water. The dry ingredients are then mixed into the water, forming a homogeneous slurry. The slurry is then applied, pumped, dumped or poured onto a substrate and allowed to set, forming the floor or subfloor.

Although this floor product does not require finishing, finishing the surface is desirable under circumstances as will be known to those skilled in the art. Choice of a finishing technique allows the finisher to control the surface properties to some degree, including the surface wear. The floor is optionally finished by any technique known to cement finishers, including but not limited to floating, pinrolling or screeding.

These and other embodiments are demonstrated in the following Examples. In the examples, unless otherwise noted, all amounts listed are in pounds. Concentrations or percentages are calculated on a dry, aggregate-free weight basis.

Several of the examples use a slump test to study the how well an aggregate such as sand is suspended in the slurry. The test is intended to simulate conditions where a floor is being poured and the slurry is pumped through hoses. Occasionally the pump has to be stopped to switch to a different batch or to move to a different section of the floor. During these times the slurry sits undisturbed in the hose for several minutes before pumping is resumed. The slump test is intended to simulate these conditions.

Unless otherwise noted, a 4000 gram sample was prepared based on the dry components. All dry components, including aggregate, were weighed and dry blended together. The predetermined amount of deionized water was measured and poured into a mixing bowl. The dry blended material was added to the water and the time noted as the starting point to determine the set time. The mixing bowl was placed onto a Hobart mixer and jogged for approximately five seconds. After one minute of soaking, the material was mixed at low speed for two minutes. The bowl was removed from the mixer and the contents stirred for about 15 seconds with a wisk to assure that all material was evenly mixed.

The initial slump sample was poured into a damp 2"×4" (5 cm×10 cm) cylinder placed on a plastic sheet, slightly overfilling the cylinder. Excess material was screeded from the top, then the cylinder was lifted up smoothly, allowing the slurry to flow out the bottom, making the patty. The patty was measured (±⅛") in two directions 90° apart, and the average reported as the patty diameter. The remaining sample material was permitted to set undisturbed in the pitcher for 5 minutes. Without stirring, additional slump samples were poured at five minute intervals until all the material was gone or until the material set and could not be poured. The mix was not stirred between slump samples.

Bleed water was determined as the excess amount of water on the surface of the samples after the material had set. A 130 mL sample was poured into a 240 mL set cup and allowed to set until Vicat set was achieved. The cup containing the sample and the bleed water was weighed (±0.10 g.). Next, the bleed water was poured off and the cup shaken to remove all excess water. The cup and sample were re-weighed. The bleed water was calculated as follows:

(Initial Weight−Final Weight)÷Initial Weight*100=
% Bleed Water

Aggregated two-inch cubes were used to test density and compressive strength. Cube molds were prepared by sealing the bottom of the mold with petroleum jelly to prevent leaking and lubricating the molds with an approved release agent, such as WD-40. Sample material was poured into the corner of the cubes until they were approximately ¾ full, stirring to keep the sand suspended if needed. Using a small spatula, the sample material was vigorously agitated from corner to corner for 3–5 seconds, eliminating all bubbles in the cube. The cubes were then filled to slightly overfull, and the remaining sample material poured into the set cup for additional testing. Excess sample was screeded from the cube molds 10 minutes after Vicat set and the cubes were carefully removed from the molds approximately 50 minutes later. About 24 hours after the cubes were made, they were placed in a 110° F. (43° C.) forced air oven for eight days until constant weight was achieved.

Density of the samples was determined by weighing a number of dried cubes and applying the following formula:

Density (lb/ft$^3$)=(Weight of cubes*0.47598)÷number of cubes

Aggregated cubes were used to test for compressive strength using a compressive strength testing machine. Cubes were placed between two platens. Force was applied to the cube as the platens were pushed together. The machine recorded the pounds of force that were required to crush the cube. Total force in pounds was converted to pounds per square inch (psi) by dividing by the surface area of the sample, in this case 4 in$^2$.

References to set time refer to Vicat set time per ASTM C-472, herein incorporated by reference. The Vicat set time started from the time the plaster was added to the water for hand mixes and from the time the slurry came off the mixer for machine mixes. A sample was made up of 50 grams of dry, aggregate-free material and sufficient water to make a normal consistency for the desired application. The sample was poured onto an acrylic sheet to form a patty. A 300 gram Vicat needle was held half way between the center and the outer edge of the patty, perpendicular to the patty surface. The needle was held to the patty surface and released to fall freely of it's own weight. Set time was determined when the needle failed to penetrate to the bottom of the patty. If the degree of penetration was unclear, the needle was given a little push to determine if it had touched the underlying surface.

EXAMPLE 1

A gypsum cement formulation suitable for use in a floor underlayment product was made according to the present invention. beta-Calcined gypsum was substituted for a substantial amount of the alpha-calcined gypsum, and a high quality product was made with the addition of from about 0.025% to about 10% polycarboxylates.

TABLE I

Floor Underlayment Composition

| Component | 12–150 | 12–95 | 12–116 |
|---|---|---|---|
| beta-Calcined Gypsum | 1780 | 2710 | 3775 |
| alpha-Calcined Gypsum | 1860 | 930 | 0 |

TABLE I-continued

Floor Underlayment Composition

| Component | 12–150 | 12–95 | 12–116 |
|---|---|---|---|
| Class C Cement | 200 | 200 | 200 |
| Defoamer | 7 | 7 | 2 |
| Boric Acid | 5 | 5 | 5 |
| CSA | 0.25 | 0.25 | 0.25 |
| Proteinacous Retarder | 1 | 0.25 | 0.0938 |
| Plasticizer | Lomar | 1641 | 1641 |
| Plasticizer Amount | 12 | 17 | 27 |
| Sand Type | Mohawk | Florida | Rich MIx |
| Water, cc/1000 g dry aggregate Free components | 185 | 195 | 185 |

The dry components were dry blended and 1185 gram samples were measured. Each sample was mixed with 2815 grams of sand, then all components were added to the water and blended. Results for slump tests, density and strength are shown in Table II.

TABLE II

Physical Properties of Floor Underlayments

| | 12–150 | 12–95 | 12–116 |
|---|---|---|---|
| Slump, Inches | 10 (25.4 cm) | 9¾ (24.8 cm) | 9¼ (23.5 cm) |
| Dry Density, lb/ft$^3$ (g/cc) | 121 (1.94) | 119 (1.90) | 116 (1.85) |
| Strength, 2 Hr, psi (Kg/cm$^2$) | 966 (67.9) | 1395 (98.1) | 1095 (77.0) |
| Strength, 8 day | 2454 (172.5) | 3542 (249.0) | 2970 (208.8) |
| Bleed water | 0.829% | 0.4666% | None |

EXAMPLE 2

The floor underlayment composition of Table III was studied to determine if sands with a high percentage of fines could be used in the composition. A Rich Mix Fine Sand and Mohawk Medium sand were studied having the sieve analysis in Table III below.

TABLE III

Sieve Analysis

| | % Passing | | |
|---|---|---|---|
| Mesh # | Rich Mix Fine | Mohawk Medium | ASTM C-33 |
| #4 | 100 | 100 | 95–100 |
| #8 | 100 | 92 | 80–100 |
| #16 | 99.54 | 55 | 50–85 |
| #30 | 84.23 | 45 | 26–60 |
| #50 | 11.56 | 15 | 3–30 |
| #100 | 0.08 | 2 | 0–10 |

The Rich Mix sand is unusually high in the amount of material in the middle range, passing through the #16 and #30 U.S. Standard sieves. Because fine sands require more water to fluidize the matrix, the increased amount of water contributes to the settling of the sand component and increased bleed water.

Samples (2370 grams) of the Base Floor Underlayment Composition of Table IV were measured. The control sample, designated 2–136 had no polysaccharide added. The test sample, 2–138, had 0.3116 grams of Diutan EX-8259 added to the dry ingredients. To each sample, 1689 grams of a Mohawk medium sand and 3941 grams of Rich Mix Fine Sand were added. Water was added to achieve a target slump of a 9½ patty when the slump test was performed. Slump test results for both samples are detailed in Table V.

TABLE IV

Base Floor Underlayment Composition

| Component | Quantity |
| --- | --- |
| Beta-calcined Gypsum | 2710 |
| Alpha-calcined Gypsum | 930 |
| Class C Cement | 200 |
| Defoamer | 7 |
| Boric Acid | 5 |
| CSA | 0.25 |
| Retarder | 1 |
| Melflux 1641 | 23 |

TABLE V

Slump Test Results for Floor Underlayment

| | Sample | |
| --- | --- | --- |
| | 2-136 | 2-138 |
| Polysaccharide | 0 | 0.004% |
| Initial Slump, inches (cm) | 9.75 (24.8) | 9.5 (24.1) |
| Slump @ 5 minutes | 11 (27.9) | 10 (25.4) |
| Slump @ 10 minutes | 10.625 (27.0) | 9.375 (23.8) |
| Slump @ 15 minutes | 9.75 (24.8) | 9.75 (24.8) |
| Slump @ 20 minutes | No Slump | 9 (22.9) |
| Slump @ 25 minutes | No Slump | 8 (20.3) |

EXAMPLE 3

A premium near self-leveling gypsum cement composition was made with a mixture of alpha and beta-gypsum, cement and polycarboxylates. Mixtures with water demand considerably below theoretical could be prepared using the composition described above.

The Stabilizer referenced in this example is a physical mixture of 70% of alpha-calcined gypsum and 30% of polysaccharide by weight.

TABLE VI

Compositions of Premium Floor Underlayments

| Component | 2-101 | 2-108 | 2-118 |
| --- | --- | --- | --- |
| alpha-Calcined Gypsum | 2110 | 2110 | 2110 |
| beta-Calcined Gypsum | 1000 | 1000 | 1000 |
| Class C Cement | 560 | 560 | 560 |
| Polycarboxylate | 12 | 15 | 25 |
| Defoamer | 0 | 0 | 2 |
| CSA | 0 | 0 | 0.3 |
| Retarder | 1.5 | 3.75 | 2.5 |
| Stabilizer | 0.5 | 0.5 | 0.5 |

Samples were prepared using 1333 grams of each of the above compositions mixed with 2667 grams of a medium Mohawk sand. Water was added until a slump of 9½–9¾ inches (24.1 to 24.8 cm) was obtained.

TABLE VII

Polycarboxylate Addition to Premium Floor Underlayment Composition

| | Sample | | |
| --- | --- | --- | --- |
| | 2-101 | 2-108 | 2-118 |
| Consistency, cc water/1000 g | 160 | 150 | 135 |
| Slump, inches (cc) | 9½ (24.1) | 9 (22.9) | 9¾ (24.8) |
| Dry Density, lb/ft$^3$ (g/cc) | 124.8 (2.0) | 128.1 (2.05) | 133.0 (2.13) |
| 2 Hr. Strength, psi (Kg/cm$^2$) | 1417 (99.6) | 1692 (119.0) | 1825 (128.3) |
| 8 Day Strength, psi (Kg/cm$^2$) | 4563 (320) | 4883 (343) | 5779 (406) |

As the concentration of polycarboxylate increased, the amount of water decreased, density and strength of the product increased. At a consistency of 135 cc/1000 grams of dry composition, the product had less than the theoretical amount of water needed for complete hydration. Yet, the strength and density were not obtained at the expense of the flow properties.

EXAMPLE 4

An improved self-leveling floor composition comprises gypsum cement and polycarboxylates and polysaccharides.

TABLE VIII

Self-Leveling Floor Underlayment Composition

| Component | Amount |
| --- | --- |
| Beta-calcined Gypsum | 1000 |
| Class C Cement | 950 |
| Accelerator | 10 |
| 50E200 | 40 |
| Melflux 1641 | 20 |
| Defoamer | 2 |
| Oklahoma Sand | 1400 |
| Mohawk Fine Sand | 600 |
| CSA | 0.5 |

The above formula was used to determine how long the floor underlayment composition would retain its self-healing properties after pouring.

TABLE IX

Working Properties of Self-Leveling Compositions

| Time Since Mixing | Comments |
| --- | --- |
| 10 minutes | Self healing |
| 13 minutes | Self healing |
| 16 minutes | Self healing slowly |
| 20 minutes | Self healing slowly |
| 23 minutes | Self healing slowly |
| 28 minutes | Edges drying, middle heals slowly |
| 31 minutes | Edges drying, middle heals slowly |
| 36 minutes | Edges drying, middle heals slowly |
| 43 minutes | Middle heals very slowly |
| 45 minutes | Middle soft, edges not healing |

The data of this example shows that a self-leveling gypsum formula has been achieved using all beta-calcined gypsum with good working time, as indicated above.

EXAMPLE 5

Finishing properties of the underlayment material was studied to determine the ease with which the product could be finished. A self-leveling flooring composition was prepared with the amounts of all components shown in Table VIII, but with the amounts of Polycarboxylate, 50E200 Polymer and polysaccharide stabilizer modified as follows:

TABLE X

Floor Finishing Samples

| Sample | 145A | 145B | 145C | 167 |
|---|---|---|---|---|
| Melflux 1641 | 18 | 17 | 17 | 17 |
| Retarder | 0.75 | 0 | 0 | 0.5 |
| 50E200 | 0 | 0 | 0 | 0 |
| Water, per 100 g | 30 | 33 | 33 | 33 |
| Slump | 12 | 11½ | 8 | 10 |
| Working Time | — | 30 | 20 | 30 |
| Finishing | Pinrolled Well | Sets Too slow | Pinroll Left Ridges | Pinrolled Well |

EXAMPLE 6

Fluidity of a flooring composition was tested by comparing the addition of polysaccharide compared to a sulfonated naphthalene. The compositions of the base flooring composition is supplied in Table XI below:

TABLE XI

Base Floor Underlayment Composition

| Beta-calcined Gypsum | 1232 grams |
|---|---|
| Class C Cement | 100 grams |
| Defoamer | 5.33 grams |
| Set Accelerator | 0.08333 grams |
| Sand | 2667 grams |

This example examines the amount of polycarboxylate needed to yield a slump of 9½ inches compared to the amount of a sulfonated naphthalene plasticizer needed for the same slump. The plasticizer was added to the base flooring compound in amounts shown in Table XII.

TABLE XII

Slump Test Results for Sulfonated Naphthalene and Polycarboxylate Superplasticizers

| | Sample | | |
|---|---|---|---|
| | 11-136A | 11-136B | 11-136C |
| Base Flooring Cmpd, g | 1333 | 1333 | 1333 |
| Plasticizer Used | MVA 1641 | Lomar D | Lomar D |
| Plasticizer Amount, g | 2.24 | 2.24 | 8.325 |
| Slump, inch (cc) | 9½ (24.1) | None | 9¼ (23.5) |
| Set Time | 62 min. | | 80.5 min. |
| Strength, 2 hr, psi (Kg/cm$^2$) | 8292 (583) | | 5856 (412) |
| Strength, 8 day | 5908 (415) | | 4125 (290) |
| Dry Density, lb/ft$^3$ (g/cc) | 129.92 (2.08) | | 92.80 (1.48) |
| Bleed Water | None | | 0.0095% |

The amount of sulfonated naphthalene plasticizer, Lomar D® needed was almost four times the amount of polycarboxylate, MVA 1641, to obtain the same fluidity for a flooring composition. At the same fluidity, the flooring of sample 11-136A was stronger, denser, set faster and had less bleed water, resulting in a superior product. When the two plasticizers were used at the same concentration, as in Samples 11-136A and B, Sample 11-136B was too thick to spread at all.

The embodiments and examples shown herein are intended to exemplify the invention and are not intended to limit it in any way. Optional ingredients of the composition can be combined in any useful manner with any embodiment of this invention. Additional embodiments and uses for this invention will be apparent to an artisan in this particular field.

What is claimed is:

1. A mixture to be employed in conjunction with water for preparing a slurry that hydrates to form a high strength flooring compound, comprising:
    about 50% to about 98% by weight calcium sulfate hemihydrate, at least 25% of said calcium sulfate hemihydrate being the beta-calcined form;
    about 0.2% to about 10% by weight of a polycarboxylate dispersant comprising a copolymer of an oxyalkylene-alkyl ether and an unsaturated dicarboxylic acid; and
    0.05–50% by weight enhancing component.

2. The mixture of claim 1 wherein said calcium sulfate hemihydrate comprises at least 90% by weight of the beta-calcined form.

3. The mixture of claim 2 wherein said calcium sulfate hemihydrate consists essentially of the beta-calcined form.

4. The mixture of claim 2 wherein the concentration of said hemihydrate is from about 80% to about 95% by weight.

5. The mixture of claim 1 wherein said enhancing component comprises lime.

6. The mixture of claim 5 wherein the concentration of said lime in said mixture is from about 0.05% to about 10% by weight.

7. The mixture of claim 1 wherein said mixture comprises from about 0.2% to about 1% by weight polycarboxylate on a dry, aggregate-free basis.

8. The mixture of claim 1 further comprising polysaccharide.

9. A subfloor comprising a hydrated product of a pumpable slurry comprising:
    about 50% to about 98% calcium sulfate hemihydrate, said hemihydrate comprising at least 25% of the beta-calcined form;
    about 0.2% to about 10% of a polycarboxylate dispersant comprising a copolymer of an oxyalkylene-alkyl ether and an unsaturated dicarboxylic acid;
    about 0.05% to about 50% enhancing component; and
    from about 12 cc to about 40 cc water per 100 grams of a combined mixture of the hemihydrate, the polycarboxylate and the enhancing component on a dry solids basis, said hydrated mixture having a compressive strength in excess of 2500 psi (175 Kg/cm2).

10. The subfloor of claim 9 wherein said hemihydrate consists essentially of beta-calcined hemihydrate.

11. The subfloor of claim 9 wherein the concentration of said polycarboxylate dispersant is from about 0.2% to about 1% by weight on a dry, aggregate-free basis.

12. The subfloor of claim 9 wherein said enhancing component comprises lime.

13. The subfloor of claim 11 wherein said water is present in an amount less than 35 cc water per 100 grams mixture on a dry, aggregate-free basis.

14. The subfloor of claim 13 wherein said water is present in an amount less than 25 cc per 100 grams of said mixture on a dry, aggregate-free basis.

15. The subfloor of claim 8 wherein said slurry further comprises polysaccharide.

16. A subfloor comprising a hydrated product of a pumpable slurry comprising:
   about 50% to about 98% calcium sulfate hemihydrate, at least 25% of said calcium sulfate hemihydrate being the beta-calcined form;
   about 0.2% to about 10% of a polycarboxylate dispersant comprising a copolymer of an oxyalkylene-alkyl ether and an unsaturated dicarboxylic acid;
   about 0.05% to about 50% enhancing component; and
   from about 15 cc to about 25 cc water per 100 grams of a combined mixture of the hemihydrate, the polycarboxylate and the enhancing component on a dry solids basis, said hydrated mixture having a compressive strength in excess of 2500 psi (175 Kg/cm2).

17. A method of preparing a subfloor comprising:
   obtaining ingredients comprising from about 50% to about 98% calcium sulfate hemihydrate comprising at least 25% of the beta-calcined form, from about 0.2% to about 10% of a polycarboxylate dispersant comprising a copolymer of an oxyalkylene-alkyl ether and an unsaturated dicarboxylic acid; and from about 0.05% to about 50% of an enhancing component, all on a dry solids basis;
   separating the ingredients into wet ingredients and dry ingredients;
   dry blending the dry ingredients;
   measuring from about 12 cc to about 40 cc of water per 100 grams of the ingredients on a dry solids basis;
   forming a mixture of the wet ingredients and the water;
   forming a slurry from the dry ingredients and the mixture;
   pouring the slurry in an area prepared for the subfloor; and,
   allowing the slurry to set, forming the subfloor having a compressive strength in excess of 2500 psi.

18. The method of claim 17 wherein the calcined gypsum comprises beta-calcined gypsum.

19. The method of claim 17 wherein said calcium sulfate hemihydrate comprises at least 80% by weight of the dry mixture on an aggregate-free basis.

20. The method of claim 17 further comprising the step of mixing an aggregate into the dry ingredients prior to forming the slurry.

21. The method of claim 17 further comprising packaging the dry mixture after said dry blending step.

22. A subfloor comprising the hydrated product of the process of claim 16.

* * * * *